United States Patent [19]

Nemit

[11] Patent Number: 5,017,923
[45] Date of Patent: May 21, 1991

[54] OVER THE HORIZON COMMUNICATION SYSTEM

[75] Inventor: Jeffrey T. Nemit, Oxnard, Calif.

[73] Assignee: ITT Corporation, New York, N.Y.

[21] Appl. No.: 503,420

[22] Filed: Mar. 30, 1990

[51] Int. Cl.$^5$ ..................... G01S 13/86; H04B 13/00
[52] U.S. Cl. .................................. 342/52; 342/367; 342/22; 455/64
[58] Field of Search ............... 342/52, 67, 367, 421, 342/453, 22, 26; 455/64

[56] References Cited

U.S. PATENT DOCUMENTS

| 2,639,422 | 5/1953 | Harris | 342/453 X |
| 3,445,844 | 5/1969 | Grossi et al. | 342/367 |

FOREIGN PATENT DOCUMENTS 0656004 4/1979 U.S.S.R. ................. 342/26

Primary Examiner—Gilberto Barrón, Jr.
Attorney, Agent, or Firm—Arthur L. Plevy; Patrick M. Hogan

[57] ABSTRACT

An over the horizon communications system includes a transmitter for generating a signal to be communicated, an acoustic source located on the earth in a direction from the transmitter that the communication is to take place which is capable of providing periodic variations in the density of the atmosphere, and means for directing the transmitter at the variations to cause the signal to be redirected over the horizon to a point of reception. The point of reception may be a radar target and the signal may be returned, or the point of reception could be a communication receiver.

9 Claims, 3 Drawing Sheets

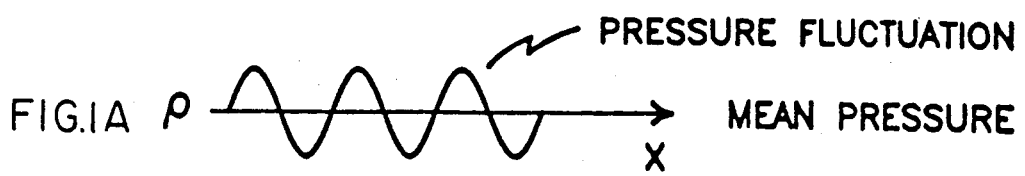
FIG.1A  PRESSURE FLUCTUATION / MEAN PRESSURE
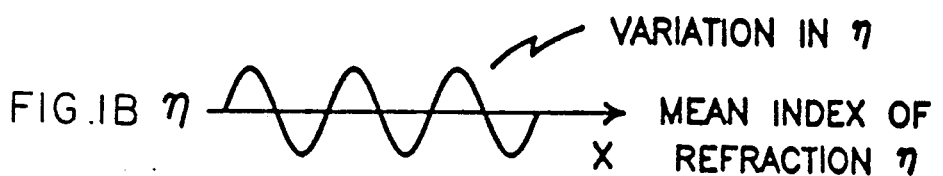
FIG.1B  VARIATION IN $\eta$ / MEAN INDEX OF REFRACTION $\eta$
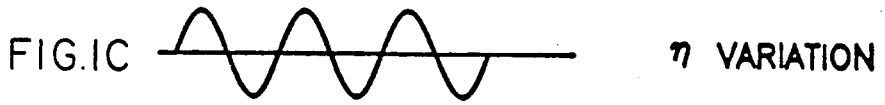
FIG.1C  $\eta$ VARIATION
FIG.1D  RF FIELD
PATH PHASE — ONE WAY
PATH PHASE TWO WAY
FIG.1E 90°  DISTURBANCE POSITIVE $+\epsilon$
FIG.1F 270°  DISTURBANCE NEGATIVE $-\epsilon$

OVER THE HORIZON COMMUNICATION SYSTEM

BACKGROUND OF THE INVENTION

1. Field of the Invention

The present invention relates to a communications system for communicating over the horizon, and more particularly to such a system which employs an acoustic source for providing variations in the density of the atmosphere above the source against which, or between which, the signal may be directed over the horizon.

2. Description of the Prior Art

In the prior art systems have been employed to stimulate the atmosphere to create changes in the index of refraction off of which signals may be reflected. Russian Patent SU1252749 A1 discloses the use of an acoustic impulse with a sinusoidal filling emitted vertically upward, and a transceiver which irradiates the acoustic impulse with an electromagnetic emission. The echo signal reflected from the wave is detected, to calculate the horizontal and vertical components of wind speed. This is not an over the horizon type of application.

U.S. Pat. No. 4,222,265, Ravussin, discloses an apparatus for automatically measuring the vertical profile of the temperature in the atmosphere by the measurement of the propagation speed of sound wave pulses to which it is directly related by means of a continuous Doppler radar. Again, no over the horizon feature is disclosed.

U.S. Pat. No. 4,761,650, Masuda et al., discloses a similar system for measuring wind velocity and temperature. A similar system is disclosed in an article "Acoustic Radar Reads Wind Speed Remotely" in the Dec. 22, 1961 issue of *Electronics*, page 16, wherein again the Doppler shift to the radar wave reflected from the acoustic wave is used to calculate the wind speed.

Prior art over the horizon radar and communications systems have employed the difference in density at the ionosphere, reflecting the radio wave off the ionosphere.

It is accordingly an object of the present invention to provide an over the horizon communications system utilizing acoustic variations set up in the atmosphere for redirecting a communications signal over the horizon.

It is another object of the invention to provide a radar over the horizon system in which the acoustic variations are used to reflect a radar wave going and coming.

It is still another object of the present invention to provide a communications system in which the communications signal is channeled between density variations set up by such an acoustic source.

SUMMARY OF THE INVENTION

The foregoing and other objects are accomplished by providing an over the horizon communications system employing a transmitter for generating a signal to be communicated, and an acoustic source which is located on the earth in a direction from the transmitter that communication is to take place. The acoustic source provides variations in the density of the atmosphere against which or between which the signal is re-directed over the horizon to a target, and if the signal is a radar signal, is re-directed back to the source.

Other objects, features and advantages of the invention will become apparent from a reading of the specification, when taken in conjunction with the drawings.

BRIEF DESCRIPTION OF THE DRAWINGS

FIG. 1 illustrates the interaction of an RF field with an acoustic disturbance at an instant in time, in accordance with the invention;

FIG. 1a shows the pressure fluctuation from mean pressure with distance;

FIG. 1b shows the variation from the mean index of refraction with distance;

FIG. 1c shows the variation in the index of refraction versus path phase for one way;

FIG. 1d shows the variation in the RF field with path phase one way;

FIG. 1e shows the two way path phase with disturbance $+\epsilon$, whereas;

FIG. 1f shows the two way path phase with disturbance $-\epsilon$;

FIG. 5 illustrates a diagram of signal flow for a ducted wave such as illustrated in FIG. 4; and FIG. 6 illustrates a duct formed by two pulses of a periodic acoustic source.

DETAILED DESCRIPTION OF PREFERRED EMBODIMENTS

Figure 2:
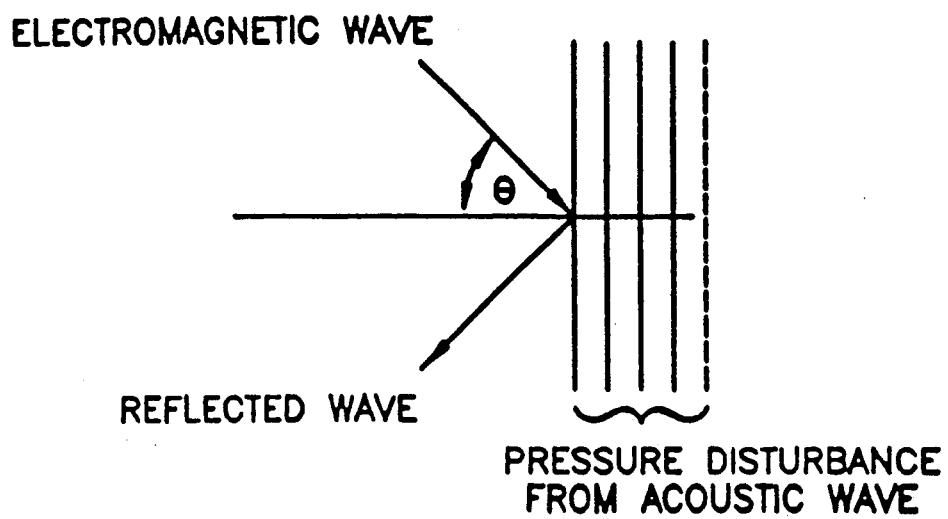
FIG. 2 illustrates the reflection at an angle $\Theta$ from the periodic disturbance.

The subject invention employs a new concept for over the horizon radar. Conventional over the horizon radar operate typically below 30 mHz and bounce the radar signal off the ionosphere. These systems are large, complex and not suitable for tactical application. At UHF and microwave frequencies ducting caused by discontinuities in the dielectric constant of the troposphere result in over the horizon propagation. However, this effect is often not well controlled and not particularly well suited for meeting long range detection requirements on a continuous basis.

The subject invention employs a method of stimulating the atmosphere to create changes in the index of refraction to achieve over the horizon characteristics at high frequencies suitable for tactical applications. It consists of illuminating the atmosphere with a powerful acoustic source such as source 10 shown in FIGS. 3-6.

The mechanism for interaction of an acoustic wave with an electromagnetic wave is through the change in density of air which in turn affects the index of refraction. The following paragraphs present a simplified analysis of the effect. The reflection from an abrupt change in medium will first be developed. This will then be extended to a periodic square wave modulation of the medium index of refraction.

Consider the case where a plane electromagnetic wave with electric field perpendicular to the plane of incidence of an abrupt increase in the index of refraction of the medium. The normalized characteristic impedance relative to the unperturbed medium is:

$$Z = \frac{\cos\Theta}{(\eta^2 - \sin^2\Theta)^{\frac{1}{2}}} = \frac{\sin\Theta}{(\eta^2 - \cos^2\Theta)^{\frac{1}{2}}} \qquad (1)$$

$$Z \approx \frac{1}{\sqrt{1 + \frac{2(\eta-1)}{\Theta^2}}} \approx 1 - \frac{(\eta-1)}{\Theta^2} \quad (2)$$

$$\Gamma = \frac{Z-1}{Z+1} \approx -\frac{(\eta-1)}{2\Theta^2} \quad (3)$$

where $$\Theta_c << \Theta << 1$$

when $$\Theta << \Theta_c \text{ then}$$

$$\uparrow \Gamma \uparrow = 1$$

where:
  $\Gamma$ = reflection coefficient
  $\eta$ = index of refraction
  $\Theta$ = wave angle measured from normal to surface
  $\Theta = 90° - \Theta$ = grazing angle
  $Z \approx \cos\Theta/\eta$ for $\Theta$ near zero degrees As the grazing angle is decreased the reflection from the interfaces increases rapidly. Below the critical angle, $\Theta_c$, reflection coefficient rapidly approaches unity and almost all the energy is reflected.

$$\Theta_c \approx \sqrt{(\eta-1)} \quad (5)$$

For example if $$(\eta-1) = 10^{-6}$$

$$\Theta_c \approx 10^{-3} \text{ (i.e., one milliradian)}$$

The above example shows that an electromagnetic wave can be reflected from very small changes in the index of refractions that are induced by an acoustic wave for small grazing angles. Similar results would be achieved when the electric vector is parallel to the interface at small grazing angles. The results are much different, however, near normal incidence.

Consider next a periodic square acoustic wave of period, od, $\lambda_a$, and a variation of $\pm\eta_o$. For the case where equation (3) above applies, the reflection from a net positive change of $2\eta_o$ is $$\Gamma_1 = -\frac{(\eta_o-1)}{\Theta^2} \quad (6)$$

The reflection from the next interface is $$\Gamma_2 = -\frac{(\eta_o-1)}{\Theta^2} \quad (7)$$

The sum of the reflection from many cycles is $$\Gamma_T = -\frac{(\eta_o-1)}{\Theta^2} \sum_{M=0}^{2M} (-1)^M e^{-j2\pi \frac{\lambda_a}{\lambda_o} \sin\Theta)M} \quad (8)$$

where:
  La = physical extent of acoustic wave.
  M = number of acoustic cycles.
  $\lambda_a$ = acoustic period.
  $\lambda_o$ = electromagnetic wavelength.

Complete addition of the elemental reflections occurs when $$\lambda_a = \lambda_o(2q \pm 1)/2\sin\Theta = \lambda_o/2\sin\Theta \quad (9)$$
$$\text{for } q = 0$$

$$\Gamma_{T,MAX} = -\frac{2M(\eta_o-1)}{\Theta^2} \quad (10)$$
$$= \frac{2(\eta_o-1)La}{\Theta^2 \lambda_a} = \frac{4(\eta_o-1)La}{\Theta\lambda_o}$$

Consider the following example of the interaction of an electromagnetic wave with an acoustic wave at standard temperature and pressures. Let the intensity, I, of the acoustic wave be $$I = 1.0 \text{ watt/meter}^2 \quad (11)$$

$$|\Delta P| = \sqrt{I\rho_o C} = 1 \times 407 = 20 \text{ newtons/meter}^2$$

where:
  $\rho_o$ = density of air
  C = speed of sound
  m = meters
  n = newtons
  T = temperature in degrees Kelvin
  $\Delta P$ = incremental pressure.

The sound pressure level is $$SPL = 20 \log \frac{\Delta P}{2 \times 10^{-5}} = 120 \text{ db} \quad (12)$$

which is 15 db above a symphony orchestra. Converting to the required units $$\Delta P(\text{mmHg}) = (\Delta P \text{ newtons/m}^2) \times \frac{760 \text{ mmHg}}{10^5 \text{n/m}^2} \quad (13)$$
$$= 0.15 \text{ mmHg}$$

$$(\eta-1) \times 10^6 = \frac{103\Delta P}{T} \quad (14)$$
$$= \frac{103 \times 0.15}{273°} = 0.06$$

Let a bounded columnated electromagnetic wave of extent, 10 meters by 10 meters impinge on an acoustically excited volume of air at a grazing angle of six degrees. Let the cross-sectional area of the acoustic wave be 10 meters by 100 meters and entirely encompass the electromagnetic field. Let the depth of the acoustic disturbance be 100 meters. The peak power to excite the air is $$\text{Power} = (1 \text{ watt/m}^2) \times 10 \text{ m} \times 100 \text{ m} = 1000 \text{ watts} \quad (15)$$

$$\text{Energy} = \text{power} \times \text{pulsewidth} = 300 \text{ joules} \quad (16)$$

Let the electromagnetic wavelength be $$\lambda_o = \frac{1}{40} \text{ (approximately 12 gigahertz)}$$

Let the acoustic disturbance be a square wave of period $\lambda_a$. For maximum interaction $$\lambda_a = \frac{\lambda_o}{2\sin\Theta} = \frac{1}{40} \times \frac{1}{2 \times (.1)} \quad (17)$$
$$= \tfrac{1}{8} \text{ meter (approximately 2700 hertz)}$$

Then $$\Gamma = \frac{4(\eta_o - 1)La}{\Theta\lambda_o} = \frac{4 \times 0.06 \times 10^{-6} \times 100}{0.1 \times \frac{1}{40}} \quad (18)$$

This corresponds to a loss of 40 db which would be considered small for an over the horizon communications system but somewhat excessive for a radar. The loss can be substantially reduced by increasing the sound intensity, increasing the interaction volume, or increasing the electromagnetic frequency, or decreasing the grazing angle, or a combination of the above. It is interesting that this approach favors the higher frequencies such as millimeter waves and above.

Source 10 transmits pressure disturbances in the air which result in small changes in the index of refraction of the air. While an individual disturbance is small and results in only a very small reflection of any incident electromagnetic field, a periodic acoustical wave will form a periodic variation in the index of refraction in the air. By proper selection of the frequency of the electromagnetic field and the acoustical disturbance frequency, the reflected field can be enhanced by the in-phase addition of these small reflections.

FIG. 1 shows the acoustic disturbance at an instant in time. FIG. 1a illustrates fluctuation in pressure P from mean pressure along the ordinate with distance x along the abscissa. FIG. 1b illustrates variations in index of refraction fraction $\eta$ from mean along the ordinate with distance x along the abscissa. The x scales of 1a and 1b match.

$$(\eta - 1) \times 10^6 \approx 103 P/T \quad (19)$$

where P=pressure in mm Hg and T=temperature °Kelvin.

FIG. 1c illustrates variations in index of refraction $\eta$ with phase on the same scale as FIG. 1d which illustrates the RF field variations with phase.

FIGS. 1e and 1f illustrate the two-way RF path of the maximum acoustic disturbance superposed and interacting with the RF field for positive and negative disturbance respectively, where $\epsilon = \eta - 1$.

The condition for addition of reflections is that the phase of A=phase of B, where each equal the path phase plus the reflection phase. For instance, A is $90° + 0° = 90°$, where $B = 270° + 180° = 90° + (360°)$. From FIG. 1, $\lambda_{RF} = 2\lambda a$, where $\lambda_{RF}$ equals the electromagnetic wavelength illustrated in FIG. 1d, and $\lambda a$ equals the acoustic wavelength illustrated in FIG. 1c. Then $$f_a \approx 2 f_{RF} \times C_a/C_{RF}$$

where Ca equals the speed of sound and $C_{RF}$ equals the speed of light. For other angles of incident such as shown in FIG. 2, $$\lambda_{RF} = 2\lambda a \cos\Theta$$

Figure 3:
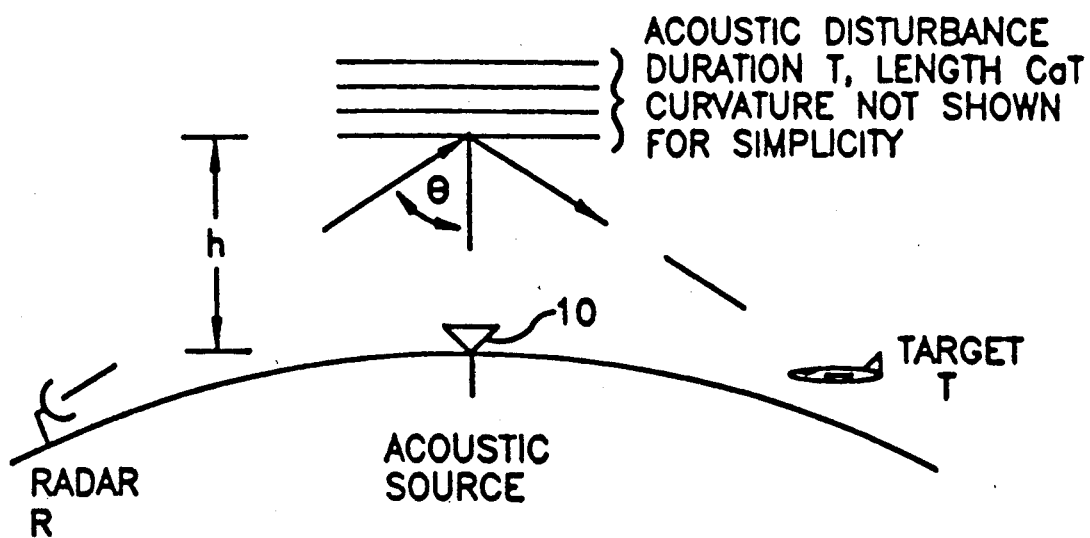
FIG. 3 is a schematic diagram of an over the horizon radar employing reflection from an elevated disturbance of an acoustic source.

There are several ways that the above interaction can be used for over the horizon communication or detection of targets. FIG. 3 shows an acoustical source 10 which emits a strong audio pulse at wavelength $\lambda_a$ of duration T. After the propagation delay a periodic disturbance is excited in the atmosphere at height h. A communications signal, for instance radar signal, may then be transmitted from sight R to illuminate the disturbance at an angle $\Theta$ and reflect the signal to the target T. The signal reflected from the target T returns by way of the same path to the radar receiver R to achieve an over the horizon extended range.

Figure 4:
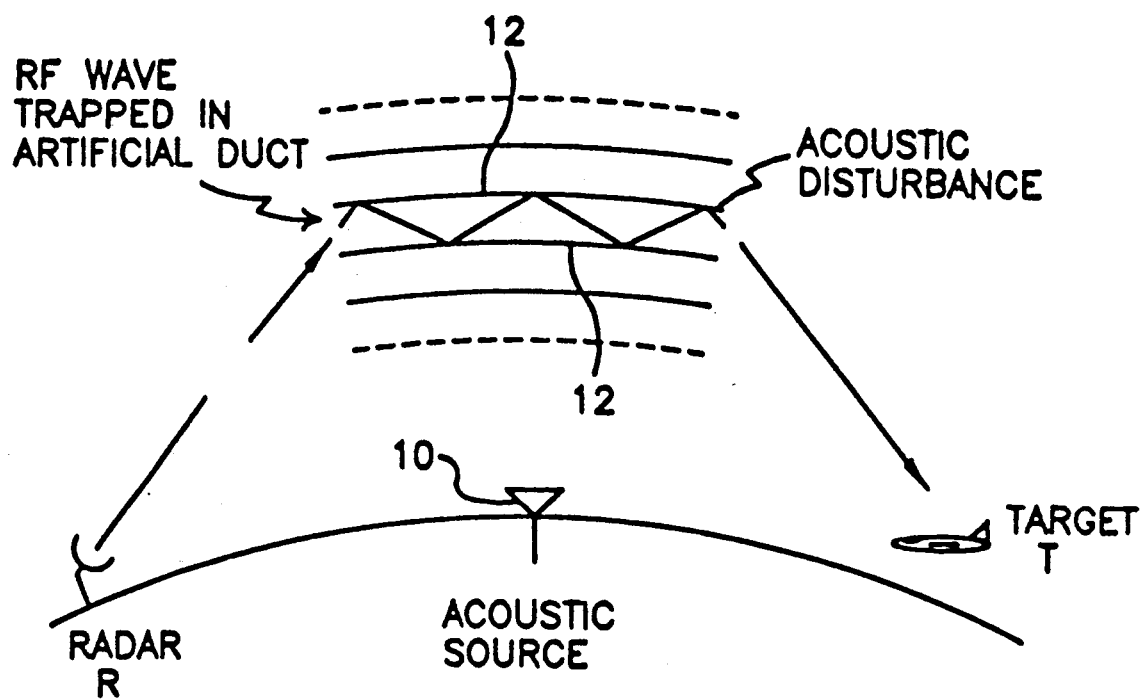
FIG. 4 shows an over the horizon radar by trapping the RF field in an artificial duct created by an acoustic source.

FIG. 4 shows another concept where the electromagnetic wave is trapped between the layered disturbances 12. These layers 12 are developed by the acoustical source 10 and form a virtual waveguide in the atmosphere, which is curved at a radius equal to the distance from the acoustical source 10. By controlling the frequency, beam width and direction of the acoustic wave, the radar signal may be redirected to positions over the horizon. Similarly, a one way communication signal can be so directed.

To describe the signal flow for over the horizon propagation, consider first the simple case of the reflection mode. At time zero the acoustic source emits a periodic acoustic signal of duration T. After an elapsed time $T_1$ from the trailing edge of the pulse, the acoustic disturbance has travelled a distance $h = C_a \times T_1$. The length of the disturbance in the atmosphere is as shown in FIG. 3, $$l = C_a \times T$$

At a time approximately equal to $T + T_1$ the radar emits a radio frequency pulse directed at the trailing edge of the acoustic disturbance. The radar signal travels to the disturbance and is reflected by it to the target. The reflection coefficient is directly related to the index of refraction variation, the extent of the interaction and the reciprocal of the direction cosine of the angle $\Theta$. As $\Theta$ approaches 90° even small disturbances can create an almost perfect reflection. It should be noted that the above process requires only a travelling acoustic wave and a standing wave is not required.

Consider now the more complex but practical situation shown in FIG. 4. The acoustic source more properly emits a spherical wave of radius h and beam width BW. FIG. 5 shows a diagram of directions of the RF signal acoustic wave and beam width. As shown the RF signal can be made to impinge on the acoustic disturbance at essentially right angles, resulting in maximum interaction or reflection. The situation is very similar in effect to a fiberoptic waveguide with a graded dielectric.

As shown in FIG. 5 the radio frequency wave is trapped in the acoustic disturbance and turned through an angle approximately equal to the beam width, and directed toward an over the horizon target. The turning radius must be large, otherwise the radar signal will leak from the duct. Maximum interaction will occur near $\Theta \approx 90°$ or $\Theta \approx 0°$. More precisely:

$$\sin\Theta = \frac{\lambda_o}{2\lambda_a} \quad (23)$$

$$\alpha_1 = \alpha_2 + \frac{BW}{2} \pm \Theta \quad (24)$$

and

-continued $$\alpha_3 = \alpha_2 - \frac{BW}{2} \pm \Theta \quad (25)$$

FIG. 6 shows another form of duct that can be formed by two pulses of a periodic acoustic source spaced by a time $T_2$ apart, resulting in a duct $h_2$ wide, where $h_2 = C_a T_2$. If $\Theta$ is below the critical angle, then a duct can also be formed by a rapid change in $\eta$ at each interior edge of the duct. Thus periodic disturbances are not required for this case. It is possible to form a two-dimensional duct in space using multiple acoustic emitters on the ground. The frequency of the acoustic wave causes a radial variation in the index of refraction of the atmosphere, while the linear array can be excited to form an angular variation in the index of refraction which is transverse to the radial variation. A simple example is a two element interferometer.

A three-dimensional variation in the index of refraction can be formed using an area acoustic array emitting a periodic waveform. The resulting lattice in space can be used to emulate Bragg-type scattering of a radar signal.

It is obvious from the foregoing that the technique of reflecting the RF signal off the acoustic disturbance boundary, or funneling it between boundaries, may be used both in a one way communications system where the target is a receiver, or in a two way radar system where the target is detected and the wave returned back by reflecting it again off the acoustic disturbance and returning it to the radar transmitter-receiver.

Since the principles of the invention have now been made clear, modifications which are particularly adapted for specific situations without departing from those principles will be apparent to those skilled in the art. The appended claims are intended to cover such modifications, as well as the subject matter described, and to only be limited by the true spirit and scope of the invention.

What is claimed as new and desired to be secured by Letters Patent of the United States is:

1. An over-the-horizon communications system including a transmitter for generating a signal to be communicated, an acoustic source located on the earth in a direction from said transmitter that communication is to take place and capable of providing variations in the density of the atmosphere and, therefore, in the index of refraction, means for directing said transmitter at said variations to cause said signal to be reflected off the extremes of said variations in density and re-directed over the horizon to a target in accordance with the change in said index of refraction.

2. The system of claim 1, wherein said target is a communications receiver.

3. The system of claim 1, wherein said transmitter is radar transmitter/receiver and said target is a target the position of which is to be detected and wherein said signal is reflected from said target and is re-directed from said variations back to said transmitter/receiver.

4. The system of claim 1 in which said signal is trapped in an artificial duct between extremes of said variations in density to re-direct said signal over the horizon.

5. The system of claim 3 in which said signal is reflected off the extremes of said variations in density to re-direct said signal back and forth over the horizon.

6. The system of claim 3 in which said signal is trapped in an artificial duct between extremes of said variations in density to re-direct said signal back and forth over the horizon.

7. The system of claim 1 in which said variations are periodic travelling waves.

8. The system of claim 3 in which said variations are periodic travelling waves.

9. The system of claim 1 wherein said variations are transitions due to a travelling acoustic wave.

* * * * *